United States Patent [19]
Tsutsui et al.

[11] Patent Number: 5,741,201
[45] Date of Patent: Apr. 21, 1998

[54] CONTROL SYSTEM FOR AUTOMATIC TRANSMISSION

[75] Inventors: Hiroshi Tsutsui, Nishio; Masahiro Hayabuchi; Masaaki Nishida, both of Anjo; Yoshihisa Yamamoto, Nishio, all of Japan

[73] Assignee: Aisin Aw Co., Ltd., Japan

[21] Appl. No.: 645,958

[22] Filed: May 10, 1996

[30] Foreign Application Priority Data

May 12, 1995 [JP] Japan .................................. 7-138378

[51] Int. Cl.$^6$ .................................................. F16H 61/20
[52] U.S. Cl. ..................................... 477/116; 477/117
[58] Field of Search ........................... 477/114–117, 156, 477/158

[56] References Cited

U.S. PATENT DOCUMENTS

| | | | |
|---|---|---|---|
| 4,709,792 | 12/1987 | Sakai et al. | 477/115 |
| 4,718,525 | 1/1988 | Yamaguchi et al. | 477/166 |
| 4,947,330 | 8/1990 | Hiramatsu | 364/424.1 |
| 5,301,572 | 4/1994 | Tanaka et al. | 477/117 |
| 5,343,782 | 9/1994 | Jamzadeh | 477/156 |

FOREIGN PATENT DOCUMENTS

| | | |
|---|---|---|
| 0627580 | 12/1994 | European Pat. Off. . |
| 21458 | 1/1986 | Japan . |
| 79562 | 3/1993 | Japan . |

OTHER PUBLICATIONS

Patent Abstracts of Japan, vol. 017, No. 407, Jul. 29, 1993.

Primary Examiner—Khoi Q. Ta
Attorney, Agent, or Firm—Lorusso & Loud

[57] ABSTRACT

A control system for an automatic transmission includes: an input clutch applied, responsive to selection of a forward running range, to transmit the rotation of an engine to a transmission mechanism; a hydraulic servo for selectively applying/releasing the input clutch; a stop state detector for detecting a stop state of a vehicle in terms of the selection of the forward running range, lack of vehicle speed, the release of an accelerator pedal and the depression of a brake pedal; starting operation detector for detecting an operation to start the vehicle in motion; application state detector for detecting the application state of the input clutch; and a controller for controlling oil pressure fed to the hydraulic servo on the basis of signals coming from the various detectors. If arrival at a predetermined released state is decided, the hydraulic servo is fed with a summed oil pressure which is the total of an initial application oil pressure and a release oil pressure, to initiate piston movement and start of engagement of the input clutch, and the oil pressure is thereafter gradually raised from the summed pressure on the basis of a predetermined pressure relationship. If a failure to arrive at the predetermined released state is decided, the oil pressure is gradually raised on the basis of the predetermined pressure relationship from the oil pressure which is fed to the hydraulic servo when a starting operation is detected.

4 Claims, 9 Drawing Sheets

|  | Clutch | | | Brake | | | | One-Way Clutch | | |
|---|---|---|---|---|---|---|---|---|---|---|
|  | C1 | C2 | C3 | B1 | B2 | B3 | B4 | F1 | F2 | F3 |
| R | × | O | × | × | × | O | O | × | × | × |
| N | × | × | × | × | × | × | O | × | × | × |
| D 1ST | O | × | × | × | × | (O) | O | × | O | O |
| D 2ND | O | × | × | O | O | × | O | O | × | O |
| D 3RD | O | × | O | O | O | × | × | O | × | × |
| D 4TH | O | O | O | × | O | × | × | × | × | × |

CONTROL SYSTEM FOR AUTOMATIC TRANSMISSION

BACKGROUND OF THE INVENTION

1. Field of the Invention

The present invention relates to a control system for an automatic transmission and, more particularly, to a control system for controlling the application and release of an input clutch for transmitting the rotation of an engine to a transmission mechanism.

2. Related Art

Conventionally, rotation of the engine is transmitted to the transmission mechanism through an input clutch. This input clutch is applied when the automatic transmission is switched from a neutral range to a forward running range (or drive range). When a vehicle is stopped in the forward running range, a power loss preventing control, i.e. the so-called the "neutral control", is effected by holding the input clutch in that state of release which immediately precedes clutch application, that is, in the standby state wherein the piston of the hydraulic servo for applying/releasing the input clutch has substantially ended its stroke, to block the transmission of power to the transmission mechanism and thereby lighten the engine load, for example, as disclosed in Japanese Patent Laid-Open Application (Kokai) No. 21458/1986. When a starting operation by the driver is detected, confirmation of start of application of the input clutch is awaited while feeding a predetermined initial oil pressure, higher than the idle oil pressure, to the hydraulic servo, and the oil pressure is gradually raised after the confirmation of start of application until completion of application of the input clutch.

When the input clutch is in its released state immediately prior to application, the piston of the hydraulic servo is standing still in a position slightly retracted from the position of the completely applied state. If the clutch is to be applied from this state, the piston is subject to a starting resistance according to the coefficient of static friction at the time of starting. As a result, the piston does not start its sliding motion from the neutral control state unless the oil pressure is raised to some extent higher than the pressure seen at the start of normal clutch application. These circumstances prolong the time period required to complete the application of the input clutch, because application does not start until the oil pressure can overcome the aforementioned starting resistance if it is merely gradually raised, as customary. According to Kokai 21458/1986, therefore, the time period for application is shortened, within a range avoiding application shock, by feeding an initial oil pressure sufficient to overcome the starting resistance and to establish the piston stroke, to thereby reliably start the application of the clutch and by then raising the oil pressure gradually.

Japanese Laid-Open Application (Kokai) No. 79562/1993 discloses another technique for release control by which the input clutch is brought into the neutral control state. According to this technique, in order to prevent shock which accompanies release of the input clutch, the control method prepares for the restart by gradually lowering the oil pressure to be fed to the hydraulic servo, on the basis of predetermined falling characteristics, to release the clutch, and by maintaining a predetermined oil pressure when the piston returns to the state immediately preceding application.

Figure 10:
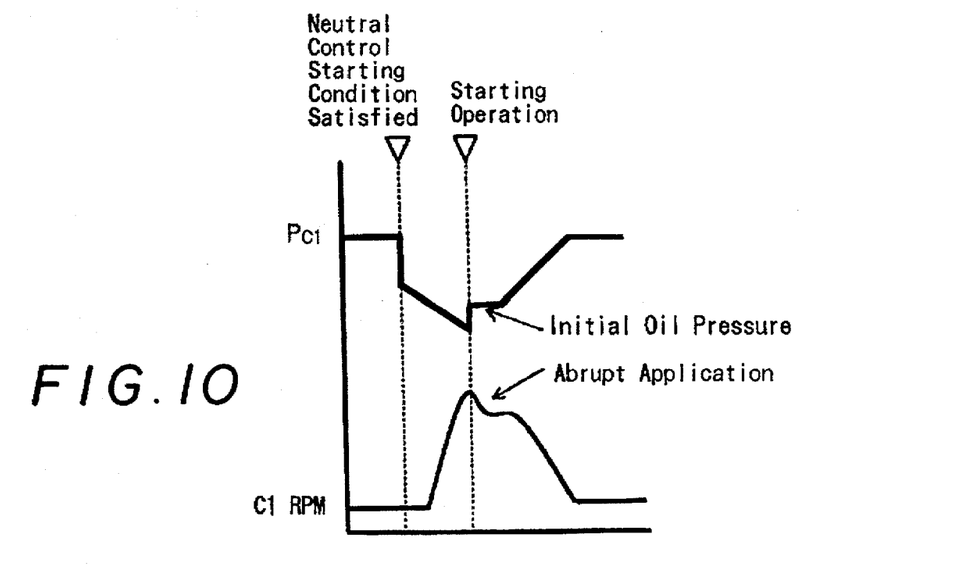
FIG. 10 is a characteristic diagram of a feed oil pressure obtained by the control unit of an automatic transmission of the prior art.

Incidentally, the system of Kokai 21458/1986 is effective for control by which the input clutch is applied from a predetermined clutch released state under the neutral control, and the system of Kokai 79562/1993 is effective for control by which the input clutch in the applied state is returned to the predetermined clutch released state under the neutral control. However, if the starting operation of the first system is performed in the course of the release of the clutch, according to the control method of the second system, a problem is encountered. Specifically, if the application control responsive to detection of the starting operation is initiated when the input clutch C1 has substantially reached the released state in the course of gradually lowering the oil pressure ($P_{C1}$), at the start of the neutral (N) control, as illustrated in the time chart of FIG. 10, the oil pressure ($P_{C1}$) to the hydraulic servo is abruptly raised to the aforementioned predetermined initial oil pressure so that the piston of the hydraulic servo imposes an intense application returning force upon the clutch without any substantial stroke. As a result, the clutch is abruptly applied by the initial oil pressure which is higher than that oil pressure intrinsically required at this time, causing application shock.

SUMMARY OF THE INVENTION

In view of the above background, the present invention, has as its first objective, provision of a control system for an automatic transmission which effects shock-free application of an input clutch by properly initiating application of the clutch in accordance with the released state of the clutch.

A second object of the present invention is to shorten the application time and prevent application shock by applying the oil pressure after a predetermined application state of the input clutch has been confirmed at the time of feeding the initial application oil pressure.

A third object of the present invention is to stably control the application time and the application shock, independent of any fluctuation in the input torque to the clutch, by detecting the input torque, i.e., the output torque from the engine.

A fourth object of the present invention is to shorten the application time period for the start-up by bringing the clutch into a predetermined released state, i.e. a pressure within a narrow range from which the piston starts its retraction and which immediately precedes the start of clutch engagement.

In order to achieve the above objects, according to a first aspect of the present invention, there is provided a control system for an automatic transmission including: an input clutch, applied responsive to selection of a forward running range, for transmitting the rotation of an engine to a transmission mechanism; a hydraulic servo for selectively applying/releasing the input clutch; stop state detecting means for detecting a "stop state" defined by selection of the forward running range, zero vehicle speed, release of the accelerator pedal and depression of the brake pedal; starting operation detecting means for detecting a starting operation, i.e. for starting vehicle movement; application state detecting means for detecting the application state of the input clutch; and control means for controlling oil pressure fed to the hydraulic servo responsive to signals from the stop state detecting means, the starting operation detecting means and the application state detecting means. The control means, in turn, includes: release means for gradually lowering, responsive to detection of the stop state by stop state detecting means, the oil pressure of the hydraulic servo to thereby release the input clutch gradually and to then hold a predetermined released state; decision means for deciding, responsive to detection of a starting operation by the starting operation detecting means, whether or not the release of the input clutch has arrived at a specific released state or standby state where the piston of the hydraulic servo has started its retraction, on the basis of the detection signal from the application state detecting means; and apply means for feeding, responsive to movement of the clutch to the specific released state, the hydraulic servo with a regulated oil pressure. This regulated oil pressure is initially set as a sum obtained by adding (1) an initial application oil pressure at an level where the piston of the hydraulic servo starts engagement of the input clutch and (2) the release oil pressure, and then raising the regulated oil pressure gradually from that initial sum. If the decide means decides a failure to arrive at the specific released state, the apply means gradually raises the oil pressure from the oil pressure, which is initially fed to the hydraulic servo when the starting operation is detected, on the basis of the predetermined rising characteristics.

If the application of the input clutch in the case of the starting operation fails to reach the specific released state, i.e., the standby position from which the piston of the hydraulic servo starts its retraction, the piston has ended the stroke for starting the engagement so that abrupt application and application shock can be prevented by raising the feed oil pressure from the oil pressure at that time, on the basis of the predetermined rising characteristics, to apply the input clutch. If the specific released state or the standby state is reached, on the other hand, an oil pressure, obtained by adding the predetermined initial application pressure to the release oil pressure, is fed to effect the piston stroke reliably against the starting resistance and then to raise the oil pressure. As a result, the input clutch can be quickly applied without any shock, in contrast to the prior art.

According to a second aspect of the present invention, the apply means feeds, responsive to a decision by the decide means of arrival at the specific released state, the oil pressure which is the sum of the initial application oil pressure which starts the application of the clutch and the release oil pressure. After a predetermined application state for the piston of the hydraulic servo starting the application of the clutch has been detected by the application state detecting means, the apply means raises the oil pressure gradually in accordance with predetermined rising characteristics.

According to this second aspect of the present invention, when the initial application oil pressure is to be fed, it is possible to shorten the application time period and to prevent the application shock, because the oil pressure is raised after it has been confirmed by the decide means that the input clutch is in the predetermined application state.

According to a third aspect of the present invention, the control means includes torque detecting means for detecting the output torque of the engine, and the apply means raises the oil pressure gradually according to the predetermined rising characteristics based upon the torque detected by the torque detecting means.

According to this third aspect of the present invention, when the oil pressure is to be raised, it is possible to stably control the application time and the application shock independently of fluctuation of the input torque by detecting the input torque to the clutch, i.e., the output torque from the engine.

According to a fourth aspect of the present invention, the release means lowers the oil pressure of the hydraulic servo gradually to release the clutch gradually, if the stop state of the vehicle is detected on the basis of the signal coming from the stop state detecting means, and then feeds the hydraulic servo with the release oil pressure capable of holding the predetermined released state for the piston of the hydraulic servo to start its retraction.

According to the fourth aspect of the present invention, it is possible to shorten the application time required to start the vehicle in motion by first bringing the clutch into the predetermined released state, a state or pressure from which the piston 11 starts its retraction, that is, the pressure or state from which the clutch starts its engagement.

DESCRIPTION OF THE PREFERRED EMBODIMENT

Figure 11:
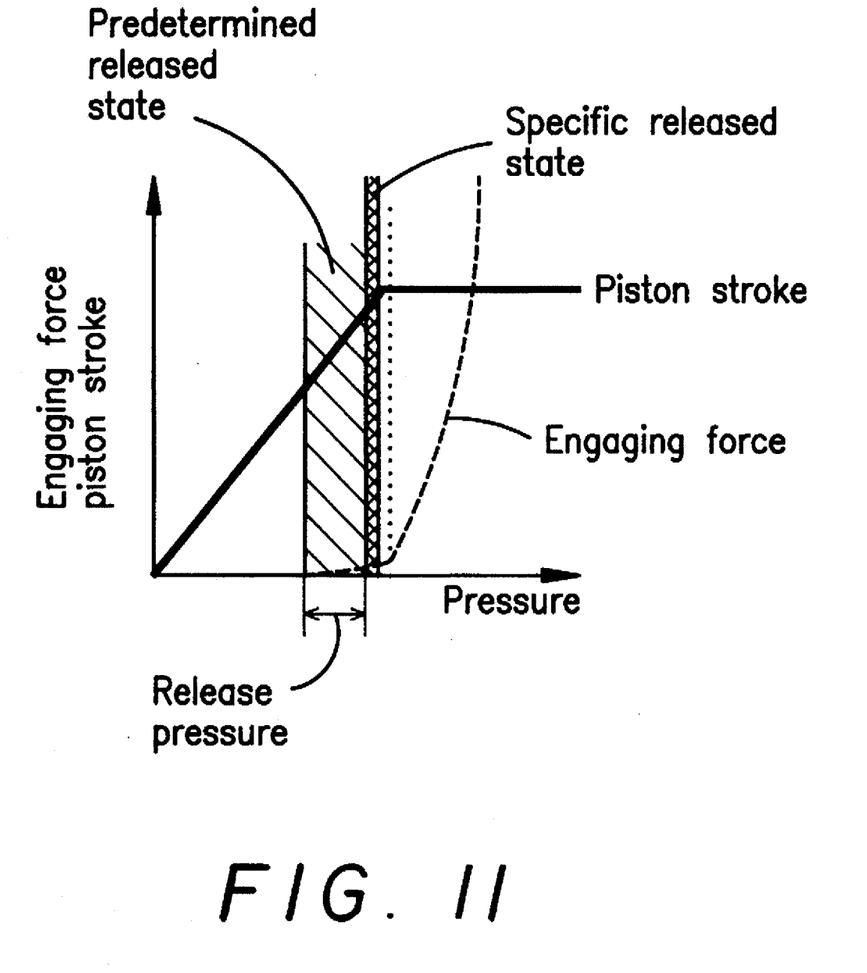
FIG. 11 is a graph of servo pressure (abscissa) versus clutch engaging force and piston stroke (ordinate) showing the "predetermined release state" and "specific released state" areas of operation.

The terms "predetermined release state" and "specific released state", as used herein, have reference to the shaded areas of operational pressures (pressures $P_{C1}$ to the clutch) shown in FIG. 11. The "specific released state" is an area within the predetermined released state" and may be considered the threshold of the "predetermined release state." The term "release pressure" ($P_{C1m}$), as used herein has reference to that pressure which brings the clutch to the point ("state") immediately prior to start of application (engagement).

Figure 1:
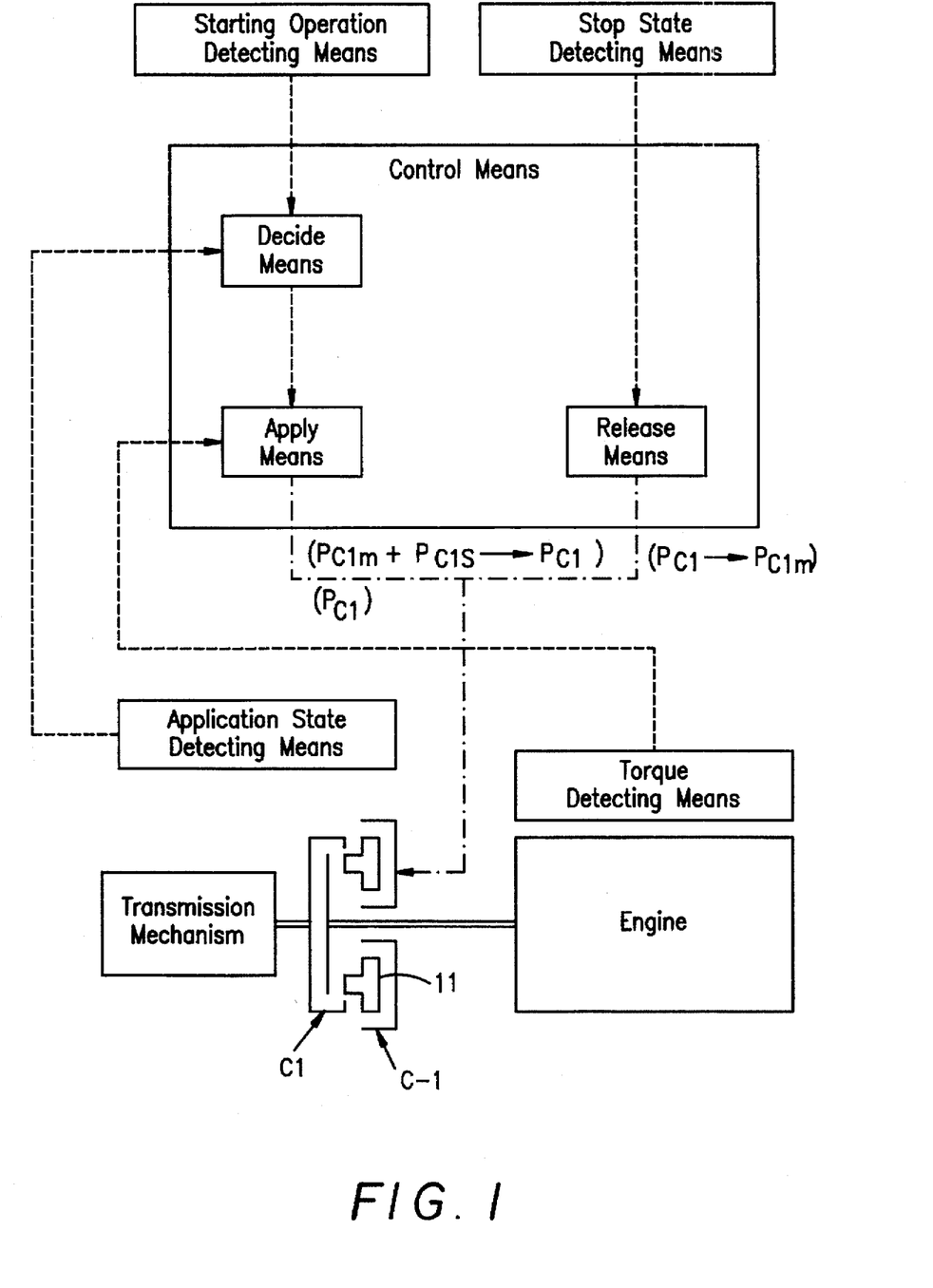
FIG. 1 is a block diagram showing an embodiment of the present invention.

Referring now to FIG. 1, one embodiment of the present invention includes an input clutch C1 which is applied, responsive to selection of a forward running range, to transmit the rotation of the engine to the transmission mechanism; a hydraulic servo C-1 for selectively applying/ releasing the input clutch C1; stop state detecting means for detecting a "stop state" of the vehicle defined by selection of the forward running range, zero vehicle speed, release of an accelerator pedal and depression of a brake pedal; starting operation detecting means for detecting a starting operation; application state detecting means for detecting the application state of the input clutch C1; and control means for controlling an oil pressure fed to the hydraulic servo C-1 on the basis of signals from the stop state detecting means, the starting operation detecting means and the application state detecting means.

The control means is provided with: release means for gradually lowering, responsive to determination of a "stop state" by the stop state detecting means, the oil pressure of the hydraulic servo C-1, to thereby release the input clutch C-1 gradually and then hold a predetermined released state, i.e. for regulating release oil pressure ($P_{C1m}$); decide means for deciding, responsive to detection of a starting operation of the vehicle, whether or not the pressure to the input clutch C1 has been released to the extent of the "specific released state" or standby state, where the piston 11 of the hydraulic servo C-1 has started its retraction, on the basis of the signal detected by the application state detecting means; and apply means for feeding, responsive to a determination by the decide means of arrival at the specific released state, the hydraulic servo C-1 with an oil pressure $P_{C1}$ determined as the sum of (1) an initial application oil pressure ($\Delta P_{C1S}$) at a level which starts the engagement of the input clutch C1 and (2) the release oil pressure ($P_{C1m}$), and for then gradually raising the oil pressure ($P_{C1}$) from that initial sum. If the decide means decides a failure in the arrival at the specific released state, the apply means gradually raises the oil pressure ($P_{C1}$) from that oil pressure which is fed to the hydraulic servo C-1 when the starting operation is detected, on the basis of predetermined rising characteristics (pressure rise map).

Figure 2:
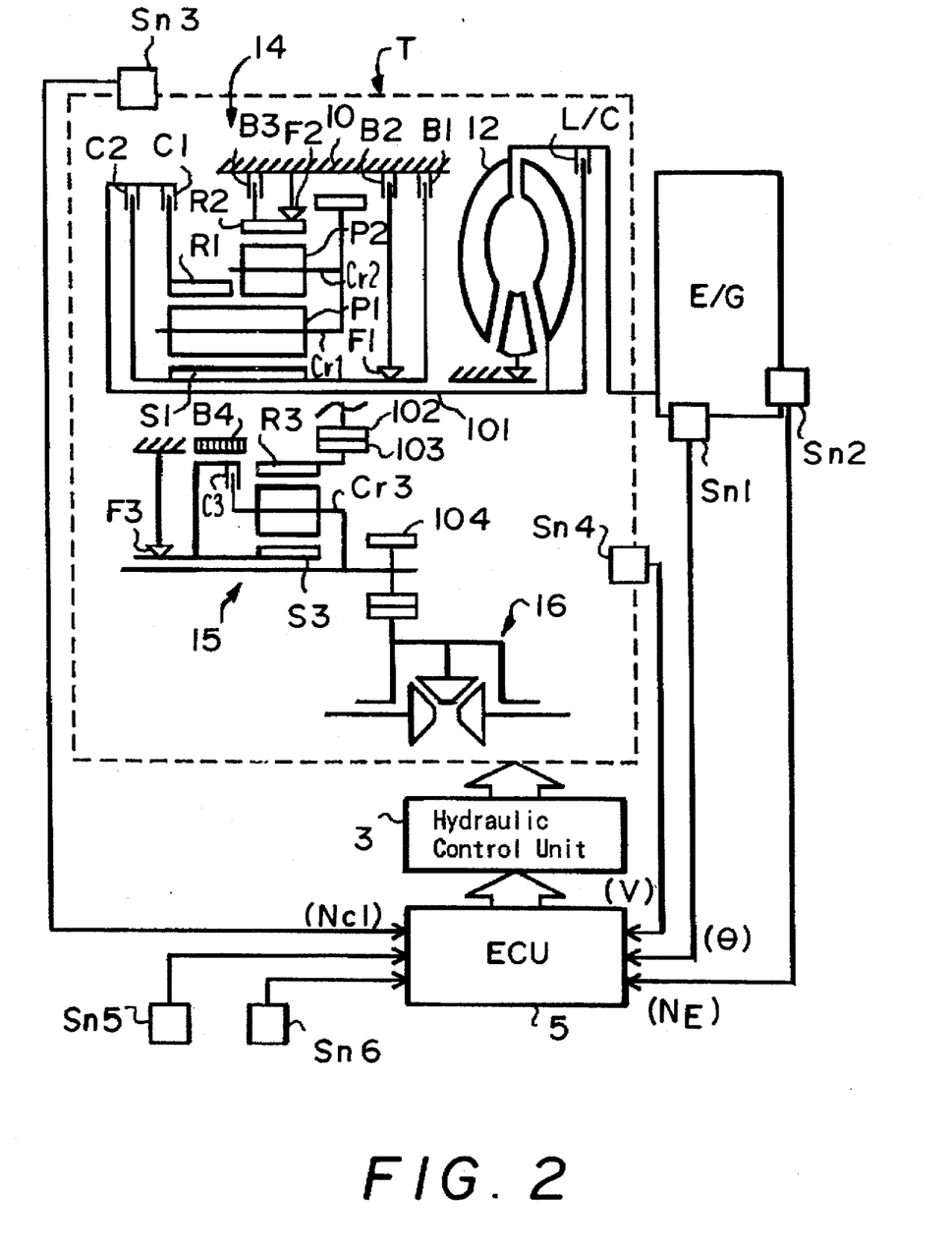
FIG. 2 is a skeletal diagram of the mechanical portion of an automatic transmission according to the embodiment.

As shown in FIG. 2, the automatic transmission T of this embodiment has a gear train providing four forward speeds and one reverse speed for a front-engine, front-drive car. The automatic transmission T includes: a torque converter 12 with a lockup clutch L/C; a gear train having a double axle construction composed of a main speed change unit 14 and a planetary gear unit 15 of the underdrive type; a differential unit 16, a hydraulic control unit 3 for controlling the gear train and the lockup clutch; and an electronic control unit ("ECU") for controlling the hydraulic control unit 3.

In the drawing: E/G designates an engine; Sn1 a throttle sensor for detecting the throttle opening (θ) of the engine E/G and for detecting release of the accelerator pedal as θ=O; Sn2 an engine rotation sensor for detecting the RPM ($N_E$) of the engine E/G; Sn3 a clutch rotation sensor for detecting the RPM ($N_{C1}$) of the input clutch C1 of the automatic transmission T; Sn4 a vehicle speed sensor for detecting the vehicle speed (V) from the output RPM; Sn5 a neutral start switch acting as range selection detecting means for detecting the shift position; and Sn6 a brake switch for detecting the depression of the brake pedal. The electronic control unit 5 issues control signals to the individual ON/OFF solenoid valves and a linear solenoid valve of the hydraulic control unit 3 on the basis of signals from the aforementioned individual sensors, i.e., mainly the vehicle speed (V) and the throttle opening (θ), according to a packaged program (control routine).

The main speed change unit 14 of the gear train of the automatic transmission T includes a planetary gear unit of single pinion construction and a planetary gear unit of a double pinion construction which are combined by sharing a sun gear S1 and one pinion gear P1, and by connecting a carrier Cr1 supporting the pinion gear P1 and a carrier Cr2 supporting the other pinion gear P2 at the double pinion side. Moreover, the sun gear S1, as shared between the two gear units of the main speed change unit 14, can be fixed through a brake B1 to the transmission case 10 and through a one-way clutch F1 and a brake B2 connected in series, to the same case 10. A ring gear R1 at the single pinion side is connected through the input clutch C1 controlled in accordance with the present invention) to an input shaft 10 connected to the turbine output of the torque converter 12, and the sun gear S1 is connected through a clutch C2 to the input shaft 101. The carrier Cr1, which supports the pinion gear P1 meshing with the sun gear S1, the ring gear R1 and the pinion gear P2, and the carrier Cr2, which supports the pinion gear P1 and the pinion gear P2 meshing with a ring gear R2, are connected to a countergear 102. The ring gear R2 at the double pinion side can be fixed to the transmission case 10 through one-way clutch F2.

Ring gear R3 of the underdrive planetary gear unit 15, used as an input element, is connected to the main speed change unit 14 through the counter gears 102 and 103. The carrier Cr3 is connected through a clutch C3 to a sun gear S3. This sun gear S3 can be fixed to the transmission case 10 through a one-way clutch F3 and a band brake B4, arranged in parallel. Carrier Cr3 is connected through an output gear 104 to the differential unit 16.

In underdrive in which the clutch C3 of the underdrive planetary gear unit 15 is released, in which the brake B4 is applied and in which the sun gear S3 is fixed so that the input is to the ring gear R3 whereas the output is from the carrier Cr3, the input to the ring gear R1, with the input clutch C1 of the main speed change unit 14 being applied, is output as the rotations of the carriers Cr1 and Cr2 by the reaction by the ring gear R2 with the one-way clutch F2 being applied, thus establishing the first speed. With the sun gear S1 fixed by the application of the brake B2, the input is output as the rotations of the carriers Cr1 and Cr2 to establish the second speed. In the directly connected state of the main speed change unit 14, with synchronous rotations of the ring gear R1 and the sun gear S1 through application of the clutch C2, the input rotation is output without change in speed from the carriers Cr1 and Cr2 to establish the third speed. With the brake B4 being released but the clutch C3 being applied, the fourth speed is established by the direct connection of the underdrive planetary gear unit 15. With the clutch C2 applied and the brake B3 applied, the input is made to the sun gear S1, and the carrier Cr2 is rotated backward with the ring gear R2 being fixed, so that the reverse stage is established.

Figure 3:
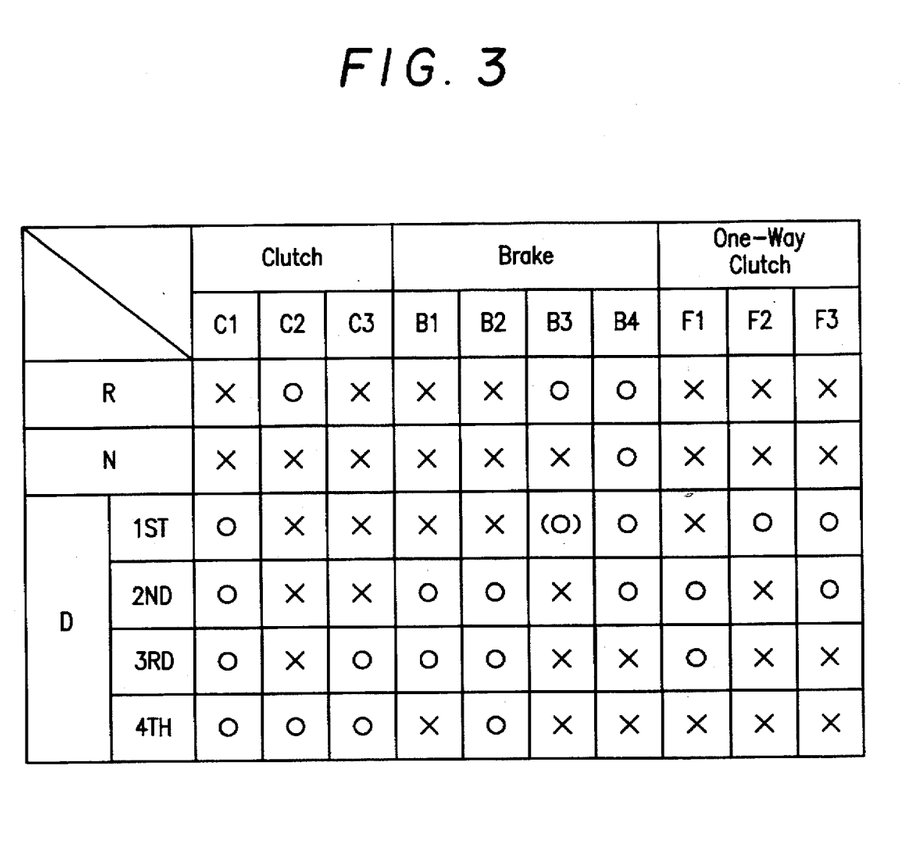
FIG. 3 is a table of operations of the automatic transmission.

FIG. 3 is a tabular compilation of the relationships between the operations of the aforementioned individual clutches, brakes and one-way clutches in the individual shift positions and the individual gear stages, i.e., the first speed (1ST) to the fourth speed (4TH). In this table: "R" indicates reverse; "N" neutral; "D" individual shift positions in drive; symbol O applied; symbol X released; and (O) application for engine braking.

Figure 4:
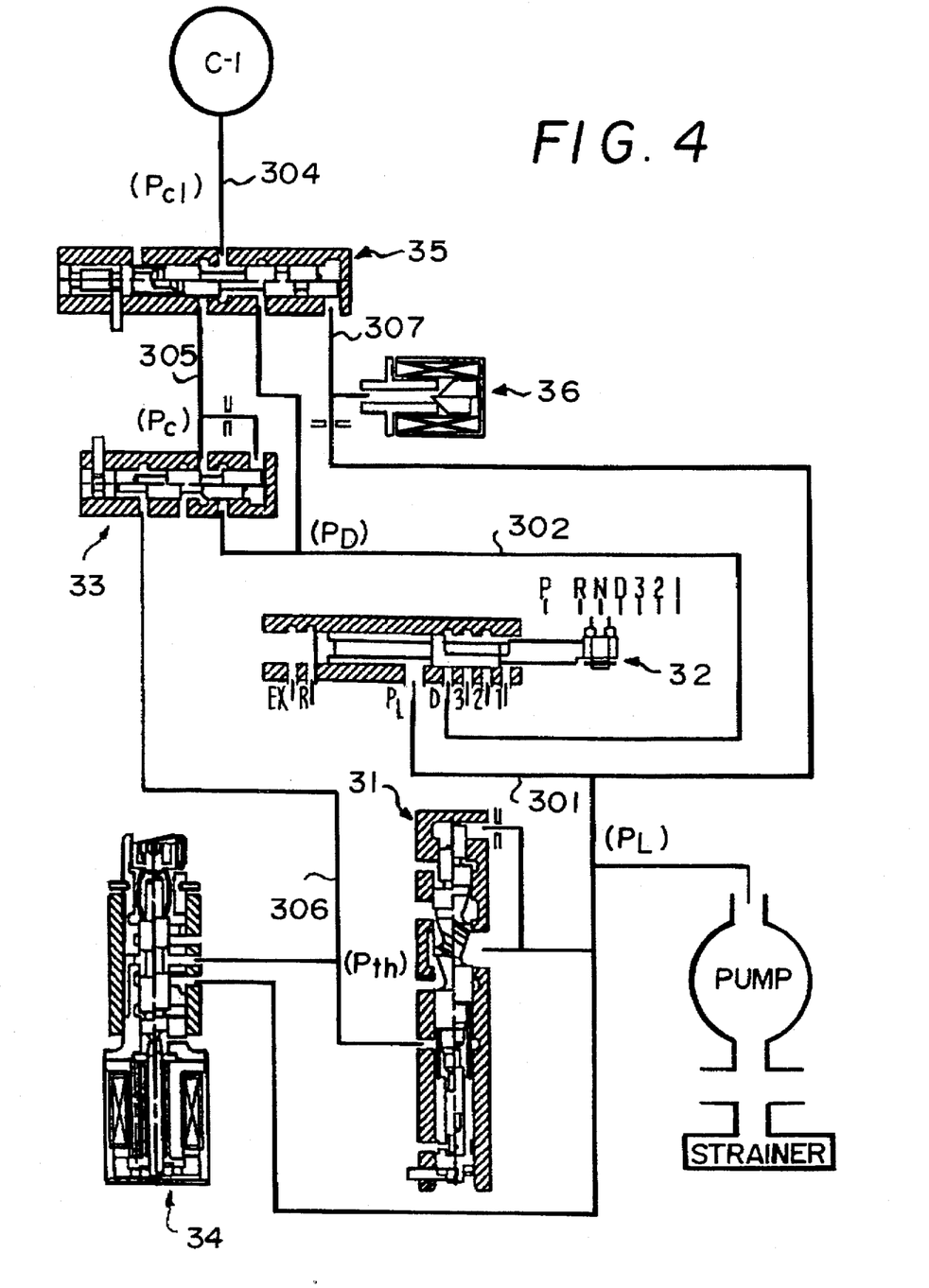
FIG. 4 is a hydraulic circuit diagram of a portion of a hydraulic control unit in accordance with the invention.

The hydraulic circuit for controlling the gear train of FIG. 2 is shown in FIG. 4 and includes various pressure regulator valves such as a primary regulator valve 31 for regulating the discharge pressure of an oil pump (PUMP) to provide a predetermined stable line pressure (PL) in accordance with the vehicle speed and the throttle opening. A (not shown) secondary regulator valve may also be provided for lowering and regulating line pressure $P_L$ to provide a torque converter feed pressure and a residual pressure as a lubrication pressure. The hydraulic control circuit further includes a manual valve 32, various solenoid valves, various shift valves and check valves and orifices interposed in the oil lines connecting the foregoing valves.

FIG. 4 shows only that portion of the aforementioned hydraulic circuit which relates to the subject matter of the present invention. This portion includes the manual valve 32, a C-1 control valve 33, a linear solenoid valve 34 for controlling the control valve 33, a C-1 change-over valve 35, and a solenoid valve 36 for controlling the change-over valve 35. The manual valve 32 is connected to a line pressure feed line 301 and a range pressure output line 302 so that it may output the D-range pressure, i.e., the line pressure ($P_L$), according to the throttle opening (θ), when the forward running range, i.e., the D-range, is selected.

The C-1 control valve 33 serves as a secondary pressure actuated, pressure reducing valve which is fed, at opposing spool ends, a throttle signal pressure ($P_{th}$) and the feedback pressure of a regulated oil pressure ($P_C$), to thereby adjust the degree of opening of an output port, an input port and a drain port. The input port is connected to the range pressure line 302; the output port is connected to a regulated oil pressure output line 305; and the feedback port is connected through an orifice to the regulated oil pressure output line 305. The linear solenoid valve 34 responds to a signal from the electronic control unit 5 to reduce the line pressure ($P_L$) to thereby output the throttle signal pressure ($P_{th}$), and this throttle signal pressure ($P_{th}$) is fed via the throttle signal pressure line 306 to the primary regulator valve 31 and the aforementioned C-1 control valve 33. Thus, the C-1 control valve 33 and the linear solenoid valve 34 function to regulate the line pressure ($P_L$) on the basis of the signal coming from the electronic control unit to thereby output the regulated oil pressure ($P_c$).

The C-1 change-over valve 35 is a spool type change-over valve for selectively connecting either its input port leading to the regulated oil pressure output line 305 or its input port leading to the range pressure line 302 to its output port, so that it is changed over when fed with the solenoid signal pressure against a spring force loading on the spool. The solenoid valve 36 is a normally open type ON/OFF valve which is closed when fed with the solenoid signal from the electronic control unit 5, to thereby drain and block the oil pressure of a solenoid signal pressure line 307 leading to the pressure feed line 301 through the orifice. Thus, the C-1 change-over valve 35 and the solenoid valve 36 function as change-over means to be selectively switched, in response to the signal from the electronic control unit 5, between a position (as indicated at the lower half of the drawing), in which the line pressure ($P_L$) is fed to the hydraulic servo C-1 of the clutch C1 via a line 304, and a position (as indicated at the upper half of the drawing) in which the regulated oil pressure (Pc) is fed.

The hydraulic circuit as shown in FIG. 4 is controlled by the electronic control unit 5. As shown in the flow chart of FIG. 5 the conditions, all of which must be satisfied for starting the neutral control, include: the signal from the neutral start switch Sn5 indicates the range position is the D-range; the signal of the vehicle speed sensor Sn4 indicates the vehicle speed (V) is 0; the throttle opening (θ), as sensed by the throttle sensor Sn1 is 0; and the brake switch Sn6 is ON. If all of the foregoing are satisfied, the answer is YES and a flag for changing the control mode into the neutral control is set to F=0 at the next Step S-2. At Step S-3, a signal $S_L1$ to the solenoid valve 36 is turned ON. At this time, in the circuit shown in FIG. 4, the drain of the line 307 is closed when the signal $S_L1$ to the solenoid valve 36 is turned OFF, so that the C-1 change-over valve 35 is switched from the spool position shown in the lower half of the drawing, for feeding the line pressure ($P_L$), to the regulated oil pressure feeding position, i.e., the spool position shown in the upper half of the drawing. As a result, the regulated oil pressure output line 305 communicates with the hydraulic servo C-1 through the C-1 change-over valve 35 and the line 304 to thereby start controlled lowering of the servo pressure ($P_{C1}$). At the next Step S-4, the present engine RPM ($N_E$) is set as the engine RPM ($N_{ER}$) at the control starting time. Next, at Step S-5, the signal pressure ($P_{th}$) according to the engine RPM ($N_{ER}$) from the linear solenoid valve 34 is output to the C-1 control valve 33 so that the C-1 control valve 33 is brought into the control state of the regulated oil pressure ($P_c$) according to the signal pressure ($P_{th}$). At Step S-6, the drop of the signal pressure ($P_{th}$) for lowering the servo pressure ($P_{C1}$) at a predetermined gradient is controlled, and $\Delta P_{th1}$ designates a set value determining the rate of pressure drop.

Figure 5:
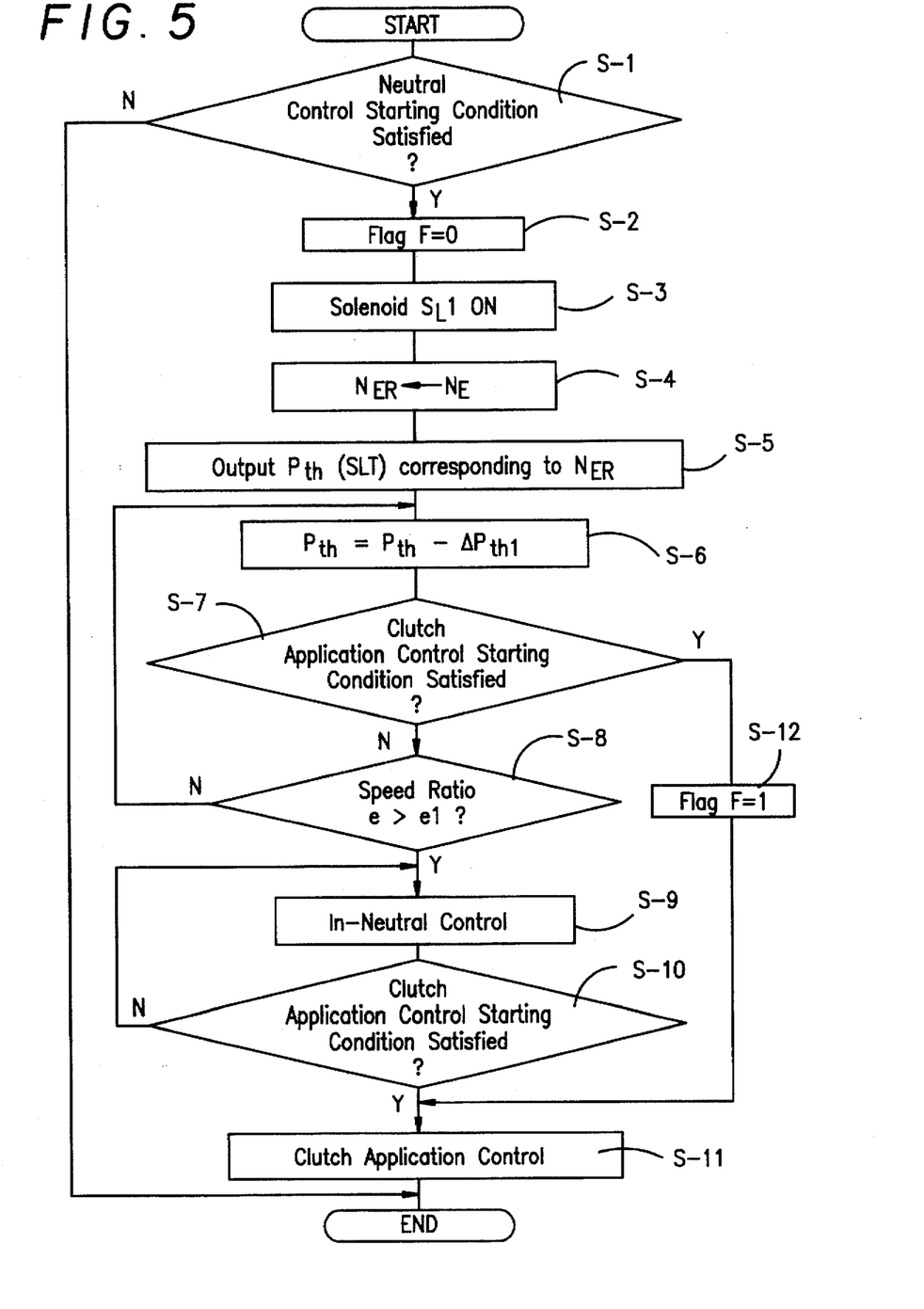
FIG. 5 is a flow chart of a main control routine for operation of the control unit in accordance with the present invention.

At the next Step S-7, whether or not the clutch application control starting preconditions are satisfied is determined. The preconditions are: that the vehicle speed (V) detected by the vehicle speed sensor Sn4 is not 0; that the throttle opening (θ) detected by the throttle sensor Sn1 is not 0; and that the brake switch Sn6 is OFF. If these preconditions are not satisfied ("NO"), the application state of the clutch C1 is detected at Step S-8. This control loop is continued until a speed ratio (e), indicating the input/output revolution ratio of the torque converter, exceeds a preset value (e1). If the release of the clutch C1 is confirmed, the routine advances to the in-neutral control sub-routine of Step S-9. This sub-routine controls the signal pressure ($P_{th}$) so as to hold the clutch C1 in the state immediately prior the start of application. Here is repeated again the determination of satisfaction of the clutch application control starting preconditions, as in Step S-7. So long as these preconditions are not satisfied, the in-neutral control sub-routine of Step S-9 is repeated to hold the clutch C1 in the neutral control state.

Figure 6:
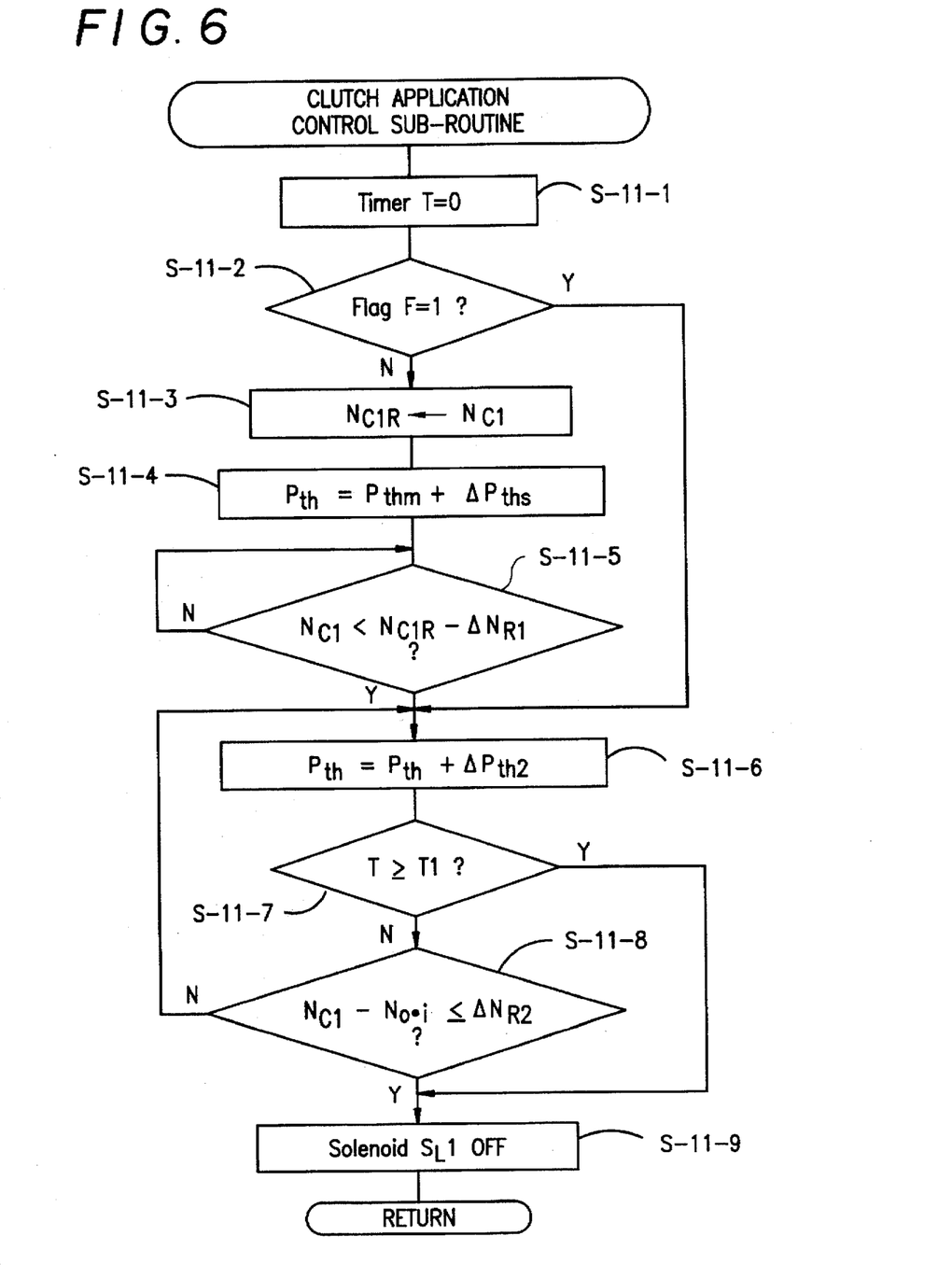
FIG. 6 is a flow chart of a sub-routine for clutch application control.
Figure 7:
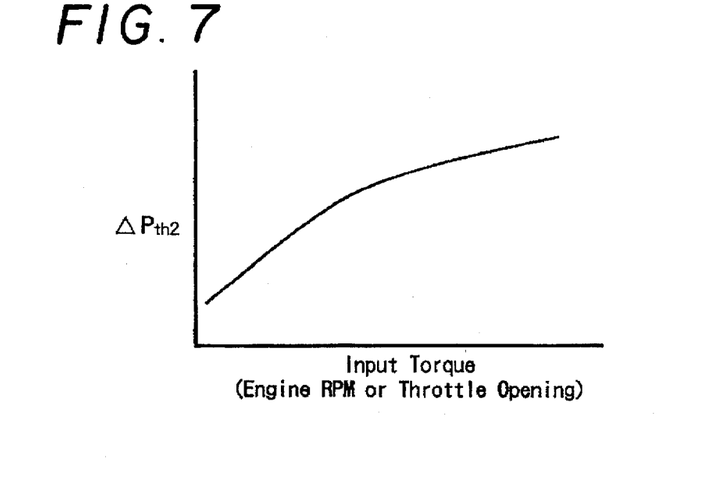
FIG. 7 is a graph serving as a map for setting initial application pressure $\Delta P_{th2}$ (ordinate) in accordance with detected input torque (abscissa)

If the clutch application control starting precondition are satisfied at Step S-7 or Step S-10 in the aforementioned main routine, the clutch application control sub-routine of Step S-11 (the subject matter of the present invention) is started either after the flag has been set to F=1 at Step S-12 for the holding of Step S-7 or directly for the holding of Step S-10. As shown in FIG. 6, a guard timer T is first set at Step S-11-1, and the routine checks flag F in the next Step S-11-2. Here, the direction of the routine depends upon whether the clutch application control starting preconditions in the previous main routine have been satisfied. If satisfied at Step S-10, the flag at Step S-2 is F=0 so that the answer of Step S-11-2 is NO and the clutch C1 remains under the in-neutral control. At the next Step S-11-3, therefore, the clutch C1 RPM ($N_{C1}$) at this time is set as clutch C1 RPM ($N_{C1R}$) at the holding time of the application control starting condition. At Step S-11-4, a signal pressure ($P_{thm}$), as output in the in-neutral control to bring the clutch C1 into the state immediately preceding application, and an oil pressure increment ($\Delta P_{ths}$), set according to the input torque or the like to establish a predetermined initial application state, is added to the signal pressure ($P_{th}$) each time this step is executed. At Step S-11-5, it is decided whether or not the present clutch C1 RPM ($N_{C1}$) is less than the difference obtained by subtracting a predetermined value ($\Delta N_{R1}$) from the clutch C1 RPM ($N_{C1R}$). At the next Step S-11-6, the signal pressure ($P_{th}$) is increased by a predetermined amount ($\Delta P_{th2}$) so as to raise the oil pressure ($P_{C1}$) by that predetermined amount for each predetermined time period. At this time, as shown in FIG. 7, the predetermined amount ($\Delta P_{th2}$) is set according to the input torque that it is increased as the input torque increases. For this purpose input torque is detected in terms of the engine RPM ($N_E$) or the throttle opening (θ). At Step S-11-7, it is decided whether or not an initially set guard timer value exceeds a value T1. If this answer is NO, it is decided at Step S-11-8 that the control is ended, if the difference between the output RPM of the clutch C1 (No·i) (the RPM calculated by multiplying the output RPM No detected by the vehicle speed sensor Sn4 by the first speed gear ratio i) and the present input RPM ($N_{C1}$) of the clutch C1 is within a predetermined value ($\Delta N_{R2}$), that is, if the clutch C1 is substantially applied. Finally, at Step S-11-9, the signal $S_L1$ to the solenoid valve 36 is turned OFF on the basis of that decision. As a result, the C-1 change-over valve 35 is switched to restore direct feed of the line pressure ($P_L$).

If, on the other hand, the clutch application control starting preconditions are satisfied at Step S-7 in the aforementioned main routine, the flag decision at Step S-11-2 is YES, so that the routine advances directly to that portion of the subroutine at and after Step S-11-6, skipping steps S-11-3 to S-11-5.

Figure 8:
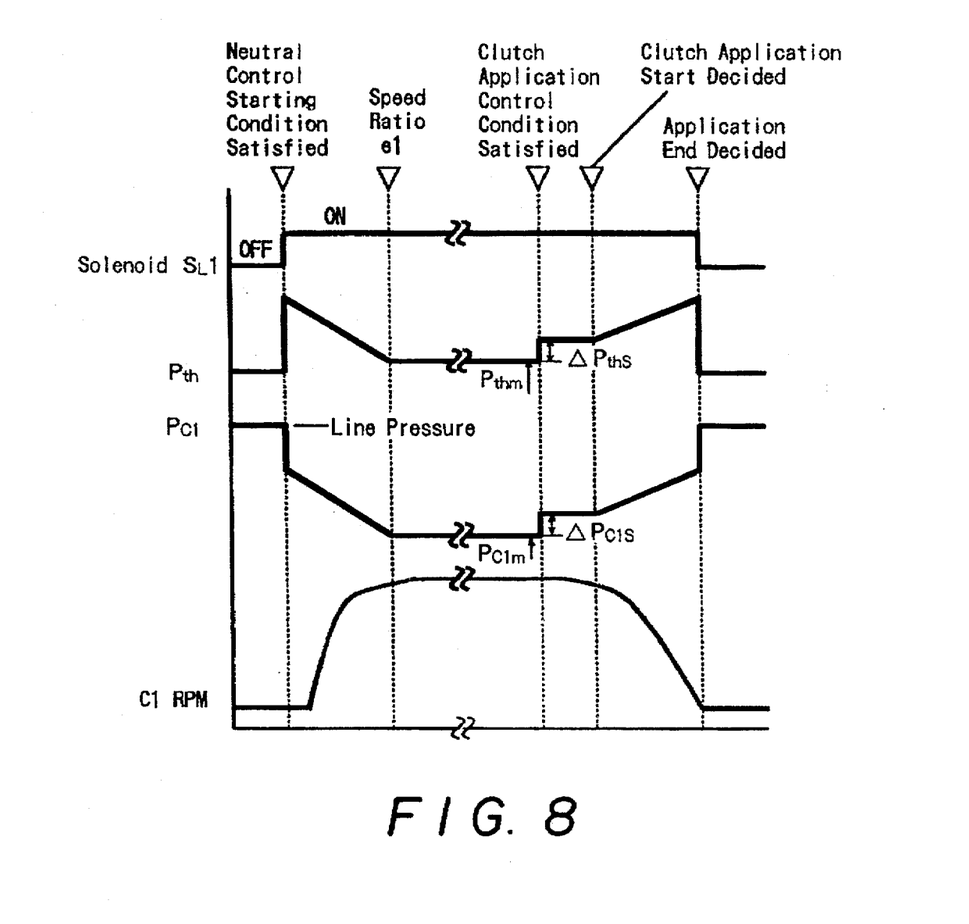
FIG. 8 is a time chart illustrating one release application procedure executed by the control unit in accordance with the present invention.
Figure 9:
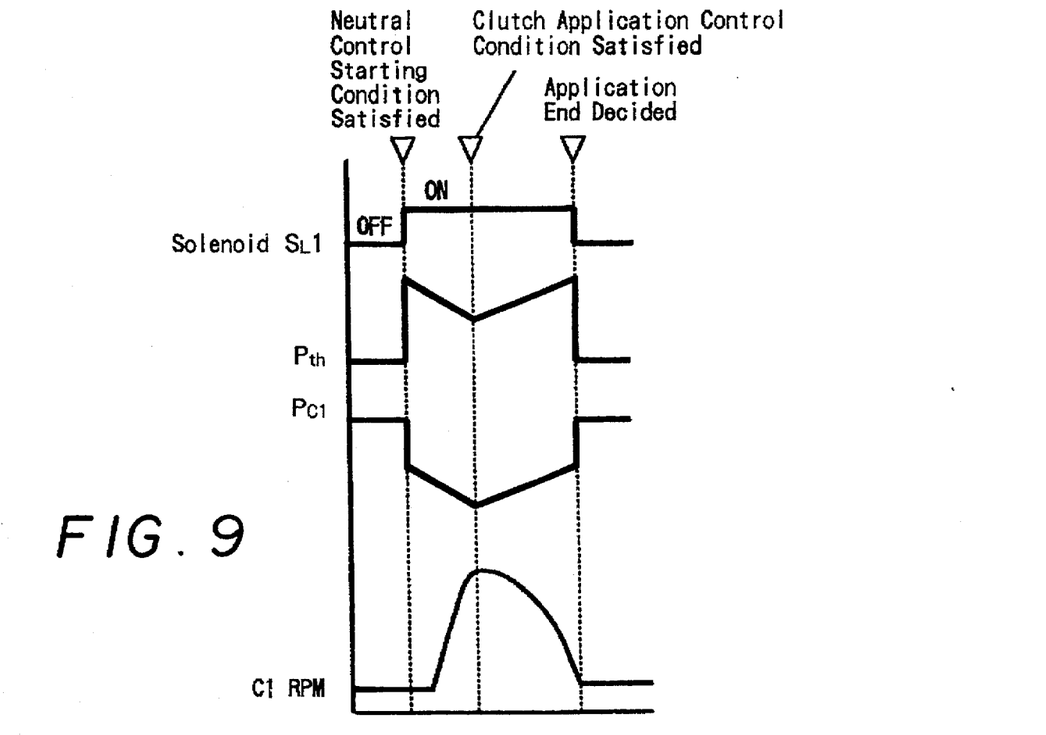
FIG. 9 is a time chart illustrating another release application procedure which may be executed by the control unit in accordance with the present invention.

The time charts, for the aforementioned routines, are illustrated in FIGS. 8 and 9. FIG. 8 illustrates the case in which the flag setting is O. As shown, the servo pressure ($P_{C1}$), as regulated by the throttle signal pressure ($P_{th}$), is lowered with the throttle signal pressure ($P_{th}$) at a predetermined reduction rate, after satisfaction of the neutral control starting preconditions and before the speed ratio (e) reaches the predetermined value (e1). When the release of the clutch C1 is confirmed at the speed ratio e=e1, the servo pressure ($P_{C1}$) is held at the constant servo pressure ($P_{C1m}$) by the control of the signal pressure ($P_{thm}$) until the clutch application preconditions hold. When the clutch application preconditions are satisfied, the servo pressure ($P_{C1}$) is also held at a constant level ($P_{C1m}+\Delta P_{C1S}$) which is increased by the increment ($\Delta P_{ths}$) of the signal pressure ($P_{thm}$) and is then raised at a predetermined rate of rise, until the completion of clutch application.

In the case of the flag setting of 1, as shown in FIG. 9, the clutch application condition is satisfied until the speed ratio (e) shown in FIG. 8 reaches the predetermined value (e1). At this instant, the servo pressure ($P_{C1}$) is instantly raised at a predetermined rate.

In short, according to the aforementioned embodiment, if the application state of the input clutch C1 in the case of the starting operation fails to reach the specific released state in which the piston 11 of the hydraulic servo C-1 starts its retraction, the stroke of the piston 11 has reached the position where application of the input clutch C1 has started so that the application shock can be prevented, without any abrupt application, by raising the feed oil pressure ($P_{C1}$) from the oil pressure at that time on the basis of the predetermined rising characteristics to apply the input clutch C1. If the specific released state is reached, on the other hand, an oil pressure, which is the total of (1) the predetermined initial application pressure ($\Delta P_{C1S}$) at which the piston 11 of the hydraulic servo C-1 starts to slide to start the application of the clutch C1 and (2) the release oil pressure ($P_{C1m}$), is fed to effect the piston stroke reliably against the starting resistance and then to raise the oil pressure. As a result, the input clutch C1 can be quickly applied without any shock, in contrast to the prior art. When the initial application oil pressure is to be fed, it is also possible to shorten the application time period and to prevent application shock by raising the oil pressure after it has been confirmed in terms of the speed ratio (e) that the input clutch C1 is brought into the predetermined application state. When the oil pressure is to be raised, it is possible to stably control the application time and the application shock independently of fluctuation in the input torque by detecting the input torque to the clutch C1, i.e., the output torque from the engine. Furthermore, it is possible to shorten the application time by, prior to start of application, bringing the clutch C1 into the predetermined released state, i.e. that pressure at which the piston 11 starts its retraction, the same pressure or minute pressure range which immediately precedes start of engagement of the clutch C1.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A control system for an automatic transmission receiving rotational torque from an engine in a vehicle, comprising:

an input clutch, applied responsive to selection of a forward running range, for transmitting the rotational torque from the engine to the transmission;

a hydraulic servo for selectively applying and releasing said input clutch;

stop state detecting means for determining a stop state for the vehicle when the forward running range is selected, vehicle speed is zero, an accelerator pedal is released and a brake pedal is depressed;

starting operation detecting means for detecting a starting operation to start the vehicle moving;

application state detecting means for detecting the application state of said input clutch; and control means for controlling an oil pressure fed to said hydraulic servo responsive to signals from said stop state detecting means, said starting operation detecting means and said application state detecting means, said control means including:

release means for lowering, according to a predetermined rate and responsive to detection of a stop state, oil pressure to said hydraulic servo to release said input clutch to a predetermined released state and for holding said input clutch in said predetermined release state;

decide means for deciding, responsive to detection of a starting operation, whether or not the release of said input clutch has arrived at a specific released state which immediately precedes start of application of said clutch, on the basis of signals from application state detecting means; and apply means, responsive to detection of a starting operation, for feeding, if said decide means decides that said input clutch is in said specific released state, said hydraulic servo with a total oil pressure which is the sum of an initial application oil pressure at which engagement of said input clutch starts and a release oil pressure, and then raising oil pressure to said hydraulic servo from said total oil pressure to apply said input clutch, and for raising oil pressure to said hydraulic servo, if said decide means decides that said input clutch is not in said specific released state, on the basis of a predetermined relationship between pressure and another parameter.

2. A control system for an automatic transmission according to claim 1, wherein, if said decide means decides that said input clutch is in said specific released state, the apply means feeds said total oil pressure and raises the oil pressure from said total oil pressure on the basis of said predetermined relationship, after said predetermined application state has been detected by said application state detecting means.

3. A control system for an automatic transmission according to claim 1, wherein said control means further includes torque detecting means for detecting the output torque of the engine, and wherein said predetermined relationship is a relationship between the oil pressure fed by said apply means and the detected output torque.

4. A control system for an automatic transmission according to claim 1, wherein said release means holds the predetermined released state for the piston of said hydraulic servo by feeding said release pressure to said hydraulic servo.

* * * * *